United States Patent
Shin et al.

(10) Patent No.: US 12,416,806 B2
(45) Date of Patent: *Sep. 16, 2025

(54) IMAGE DISPLAY DEVICE CAPABLE OF EXPRESSING MULTIPLE DEPTH

(71) Applicant: SAMSUNG ELECTRONICS CO., LTD., Suwon-si (KR)

(72) Inventors: Bongsu Shin, Suwon-si (KR); Yuntae Kim, Suwon-si (KR); Geeyoung Sung, Suwon-si (KR); Changkun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 861 days.

This patent is subject to a terminal disclaimer.

(21) Appl. No.: 17/628,111

(22) PCT Filed: Jul. 16, 2020

(86) PCT No.: PCT/KR2020/009388
§ 371 (c)(1),
(2) Date: Jan. 18, 2022

(87) PCT Pub. No.: WO2021/010772
PCT Pub. Date: Jan. 21, 2021

(65) Prior Publication Data
US 2022/0326522 A1    Oct. 13, 2022

(30) Foreign Application Priority Data

Jul. 18, 2019    (KR) .................. 10-2019-0087098
Jul. 14, 2020    (KR) .................. 10-2020-0086980

(51) Int. Cl.
*G02B 27/01*    (2006.01)
*G06F 3/01*    (2006.01)

(52) U.S. Cl.
CPC ......... *G02B 27/0172* (2013.01); *G06F 3/013* (2013.01); *G02B 2027/0127* (2013.01); *G02B 2027/014* (2013.01)

(58) Field of Classification Search
CPC ... G02B 27/01–0189; G02B 2027/0105–0198; G06F 3/00–167
See application file for complete search history.

(56) References Cited

U.S. PATENT DOCUMENTS

| 5,737,012 A | 4/1998 | Tabata et al. |
| 9,304,319 B2 | 4/2016 | Bar-Zeev et al. |
| (Continued) | | |

FOREIGN PATENT DOCUMENTS

| CN | 107077002 A | 8/2017 |
| CN | 107376349 A | 11/2017 |
| (Continued) | | |

OTHER PUBLICATIONS

Communication dated Jan. 29, 2024, issued by the China Intellectual Property Administration in Chinese Application No. 202010079696.7.

(Continued)

*Primary Examiner* — Christopher A Lamb, II
(74) *Attorney, Agent, or Firm* — Sughrue Mion, PLLC

(57) ABSTRACT

An image display apparatus includes a display device configured to modulate light to form an image; a driver configured to drive the display device such that a position of the display device varies; a light transmitter configured to transmit the image formed by the display device to an observers eye and comprising a focusing member; and a processor configured to generate a light modulation signal and a driving signal according to image information and control the display device and the driver according to the light modulation signal and the driving signal, respectively.

23 Claims, 19 Drawing Sheets

(56) References Cited

U.S. PATENT DOCUMENTS

| | | |
|---|---|---|
| 10,088,673 B2 | 10/2018 | Xu |
| 10,379,612 B1 | 8/2019 | Bonnier et al. |
| 11,030,926 B2 | 6/2021 | Shin et al. |
| 2003/0020879 A1 | 1/2003 | Sonehara |
| 2006/0232665 A1 | 10/2006 | Schowengerdt et al. |
| 2011/0205633 A1* | 8/2011 | Suzuki ............... G02B 27/0101 359/872 |
| 2015/0153572 A1* | 6/2015 | Miao ................... G02B 27/017 359/630 |
| 2016/0260258 A1 | 9/2016 | Lo et al. |
| 2016/0282626 A1 | 9/2016 | Border et al. |
| 2016/0286177 A1 | 9/2016 | Border et al. |
| 2016/0313558 A1 | 10/2016 | Gutierrez |
| 2017/0148215 A1* | 5/2017 | Aksoy .................. G02B 27/017 |
| 2017/0160798 A1 | 6/2017 | Lanman et al. |
| 2017/0255021 A1 | 9/2017 | Oto |
| 2017/0269353 A1 | 9/2017 | Xu |
| 2017/0330376 A1 | 11/2017 | Haseltine et al. |
| 2017/0336637 A1 | 11/2017 | Van Heugten |
| 2017/0357088 A1 | 12/2017 | Matsuzaki et al. |
| 2018/0015876 A1 | 1/2018 | Yamagata et al. |
| 2018/0053284 A1 | 2/2018 | Rodriguez et al. |
| 2018/0120567 A1 | 5/2018 | Cobb |
| 2018/0275367 A1 | 9/2018 | Lim |
| 2018/0275410 A1 | 9/2018 | Yeoh et al. |
| 2019/0018236 A1* | 1/2019 | Perreault ............ G02B 27/0172 |
| 2019/0212546 A1 | 7/2019 | Sohn et al. |
| 2019/0302479 A1 | 10/2019 | Smyth et al. |
| 2019/0353894 A1 | 11/2019 | Zhou |
| 2020/0125227 A1 | 4/2020 | Shin et al. |
| 2020/0285310 A1 | 9/2020 | Sazuka et al. |
| 2020/0371360 A1 | 11/2020 | Dalrymple et al. |

FOREIGN PATENT DOCUMENTS

| | | |
|---|---|---|
| CN | 109863533 A | 6/2019 |
| CN | 109923461 A | 6/2019 |
| JP | 8-234141 A | 9/1996 |
| JP | 2008-020813 A | 1/2008 |
| KR | 100703930 A | 7/2002 |
| KR | 1020140077398 A | 6/2014 |
| KR | 101592087 B1 | 8/2015 |
| KR | 101626679 B1 | 6/2016 |
| KR | 101670970 B1 | 11/2016 |
| KR | 1020180107433 A | 10/2018 |
| KR | 101917762 B1 | 1/2019 |
| KR | 1020190010345 A | 1/2019 |
| KR | 10-2019-0033405 A | 3/2019 |
| KR | 1020190033414 A | 3/2019 |
| WO | 2012175939 A1 | 12/2012 |
| WO | 2016/048546 A1 | 3/2016 |
| WO | 2016/178152 A1 | 11/2016 |
| WO | 2018/058155 A2 | 3/2018 |
| WO | 2018/196968 A1 | 11/2018 |
| WO | 2019/110617 A1 | 6/2019 |

OTHER PUBLICATIONS

Communication dated Feb. 1, 2024, issued by the China Intellectual Property Administration in Chinese Application No. 202080062250.1.

Communication issued Aug. 7, 2024 by the China National Intellectual Property Administration in Chinese Patent Application No. 202080062250.1.

Communication dated Oct. 30, 2023, issued by the European Patent Office in counterpart European Patent Application No. 20840549.8.

Communication dated Jan. 27, 2021 issued by the European Patent Office in European Application No. 20172099.2.

Communication dated Oct. 27, 2020, issued by the European Patent Office in European Application No. 20172099.2.

International Search Report (PCT/ISA/210) dated Oct. 15, 2020 issued by International Searching Authority for International Application No. PCT/KR2020/009388.

Kim et al., "Foveated AR: Dynamically-Foveated Augmented Reality Display", ACM Trans. Graph, Jul. 2019, 15 total pages, vol. 38.

Communication dated Jul. 14, 2023 issued by the European Patent Office in counterpart European Application No. 20840549.8.

Communication dated Jul. 24, 2023 issued by the European Patent Office in counterpart European Application No. 20172099.2.

* cited by examiner

IMAGE DISPLAY DEVICE CAPABLE OF EXPRESSING MULTIPLE DEPTH

TECHNICAL FIELD

The present disclosure relates to image display device capable of expressing multi-depth.

BACKGROUND ART 3-dimensional (3D) image display technology has been applied to various fields, and recently, has been applied to an image display apparatus related to a virtual reality (VR) display and an augmented reality (AR) display.

A head-mounted display that provides VR tends to now be widely applied to the entertainment industry as it becomes commercially available. In addition, the head-mounted display is developed into a form that may be applied in the medical, education, and industrial fields.

The AR display, which is an advanced form of the VR display, is an image apparatus that combines the real world and VR and has the feature of deriving the interaction between reality and VR. The interaction between reality and VR is based on a function of providing information about a real situation in real time, and may further increase an effect of reality by superimposing virtual objects or information on an environment of the real world.

In such apparatuses, stereoscopy technology is commonly used for a 3D image display, which may be accompanied by visual fatigue due to a vergence-accommodation mismatch. Accordingly, a 3D image display method capable of reducing visual fatigue has been sought.

DISCLOSURE

Technical Problem

Provided are image display apparatuses capable of multi-depth expression.

Technical Solution

According to an aspect of an embodiment, an image display apparatus includes a display device configured to modulate light to form an image; a driver configured to drive the display device such that a position of the display device varies; a light transmitter configured to transmit the image formed by the display device to an observers eye and comprising a focusing member; and a processor configured to generate a light modulation signal and a driving signal according to image information and control the display device and the driver according to the light modulation signal and the driving signal, respectively.

Additional aspects will be set forth in part in the description which follows and, in part, will be apparent from the description, or may be learned by practice of the presented embodiments of the disclosure.

The driver may be further configured to move the display device in parallel such that a distance between the display device and the focusing member varies.

The driver may include a shape variable portion which is deformable according to an applied signal to provide a driving force to the display device.

The shape variable portion may include a material of which a shape varies by heat.

The shape variable portion may include a shape memory alloy or an electro active polymer.

The light transmitter may be further configured to transmit the image formed by the display device to the observer's eye as an enlarged image on a virtual image plane at a predetermined position.

The image information may include depth information related to the position of the virtual image plane with respect to each of images of a plurality of frames, and the processor may be further configured to generate the driving signal according to the depth information.

The depth information may be information previously set from a saliency map with respect to each of the images of the plurality of frames.

The processor may be further configured to generate a scale factor to be applied to any one of images of two successive frames with different depth information and generate the light modulation signal by reflecting the scale factor to the image information.

The processor may be further configured to compute a magnification at which each of the images of the two frames is imaged and set the scale factor to 1 when a change value between two magnifications is equal to or less than a predetermined reference value.

The processor may be further configured to compute a magnification at which each of the images of the two frames is imaged and determine a similarity of the images of the two frames when the change value between two magnifications is larger than the predetermined reference value.

The processor may be further configured to set the scale factor to 1 when the similarity of the images of the two frames is equal to or less than a predetermined reference value and generate a scale factor that offsets the change value when the similarity of the images of the two frames is larger than the predetermined reference value.

The processor may be further configured to, with respect to an image of the same frame, transmit the driving signal to be delayed by a predetermined time compared to the light modulation signal and control the display device and the driver.

The predetermined time may be set to be equal to or greater than a convergence-accommodation time of an observers eye.

The light transmitter may be further configured to combine first light including an image from the display device with second light including an image of a real environment in front of an observer and transmit the combined light to the observer's eye.

The light transmitter may include a beam splitter disposed obliquely with respect to a traveling path of the first light and a traveling path of the second light and the focusing member.

The beam splitter may be a half mirror.

The display device may include a first display device and a second display device, the driver may include a first driver and a second driver respectively configured to drive the first display device and the second display device such that positions of the first display device and the second display device vary, and the light transmitter may include a first light transmitter and a second light transmitter configured to transmit images formed by the first display device and the second display device to a left eye and a right eye of an observer, respectively.

The image information may include information about a pair of left eye image and right eye image to be perceived as a three-dimensional (3D) image of one frame, and the processor may be further configured to control the first display device and the second display device such that the left eye image is formed by the first display device and the right eye image is formed by the second display device.

The image information may further include depth information related to positions of a virtual image plane on which the left eye image and the right eye image are to be imaged, and the processor may be further configured to control the first driver and the second driver according to the depth information.

The image display apparatus may be a wearable apparatus.

The driver may drive the display device to a position corresponding to one of two depth values respectively representing a near and a far.

The image display apparatus may further include an eye tracking sensor configured to sense a depth position that the observers eye views.

The processor may generate the driving signal with reference to a measurement value sensed by the eye tracking sensor.

The processor may determine whether the measurement value is within a near range or a far range, and generate the driving signal so that the display device is driven to a position corresponding to one of two representative values representing the near range and the far range.

The processor may generate the driving signal based on a depth value set by using a saliency map with respect to each image of a plurality of frames.

The processor may correct the driving signal by reflecting a measurement value sensed by the eye tracking sensor.

The processor may correct the driving signal only when a depth value set by using the saliency map and the measurement value sensed by the eye tracking sensor belong to different ranges among previously set near range and far range.

Advantageous Effects

The image display apparatuses described above may be capable of a wide range of depth expression in a compact structure.

The image display apparatuses described above may provide a 3D image combining a binocular disparity method and a depth expression.

The image display apparatuses described above may be easily applied to a wearable device, and may be applied to, for example, a glasses-type AR display apparatus, etc.

MODE FOR INVENTION

Figure 1:
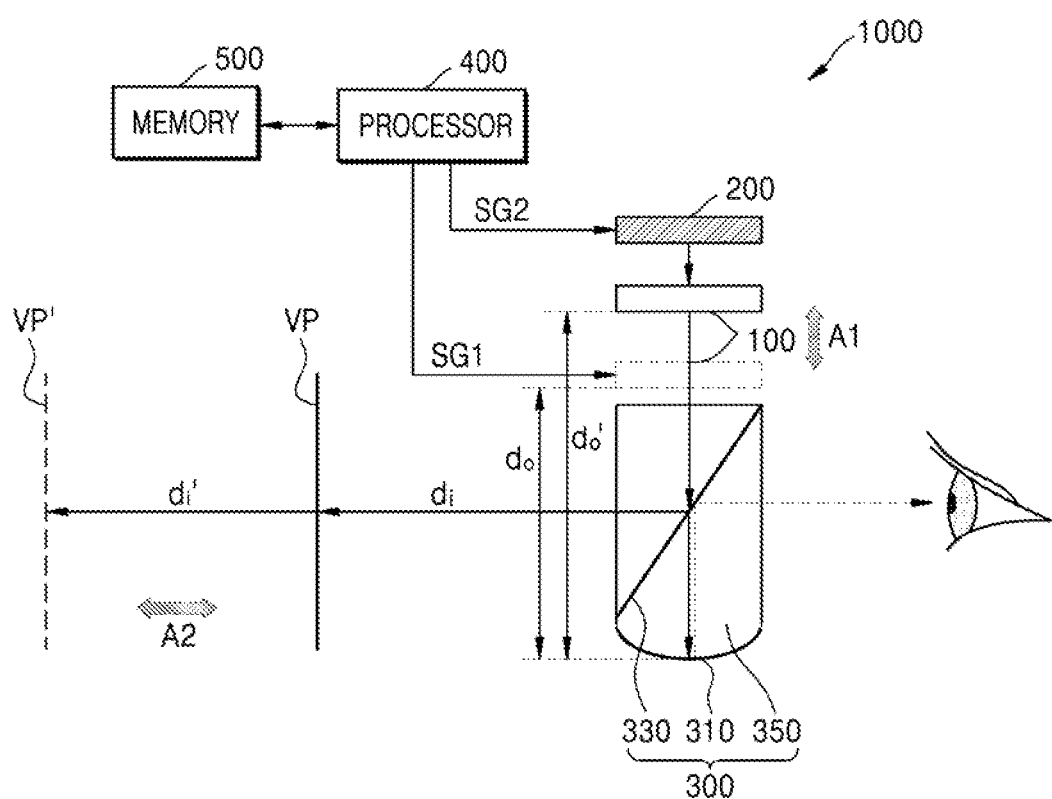
FIG. 1 is a diagram illustrating a configuration and an optical arrangement of an image display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, when a constituent element is disposed "above" or "on" to another constituent element, the constituent element may be only directly on the other constituent element or above the other constituent elements in a non-contact manner.

The expression of singularity in the present specification includes the expression of plurality unless clearly specified otherwise in context. Also, terms such as "comprise" and/or "comprising" may be construed to denote a constituent element, but may not be construed to exclude the existence of or a possibility of addition of another constituent element.

The use of the terms "a" and "an" and "the" and similar referents in the context of describing the disclosure (especially in the context of the following claims) are to be construed to cover both the singular and the plural.

Also, operations of all methods described herein may be performed in any suitable order unless otherwise indicated herein or otherwise clearly contradicted by context. The present disclosure is not limited to the described order of the operations. The use of any and all examples, or language (e.g., "such as") provided herein, is intended merely to better illuminate the disclosure and does not pose a limitation on the scope of the disclosure unless otherwise claimed.

Figure 2:
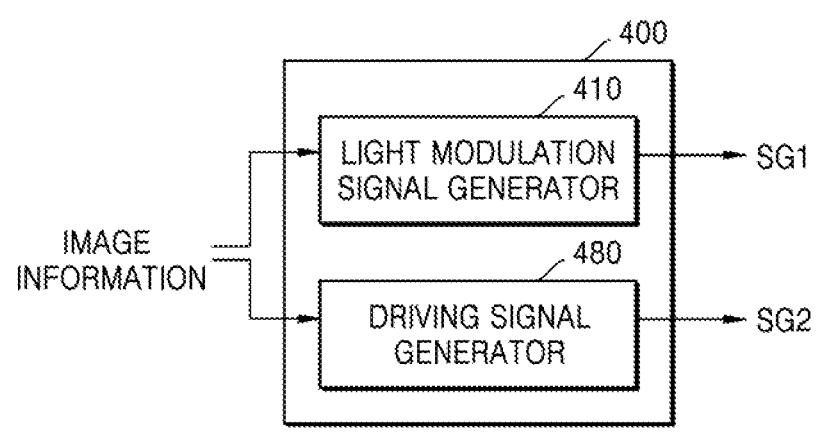
FIG. 2 is a block diagram illustrating an example of a configuration of a processor that may be employed in the image display apparatus of FIG. 1.

FIG. 1 is a diagram illustrating a configuration and an optical arrangement of an image display apparatus 1000 according to an embodiment, and FIG. 2 is a block diagram illustrating an example of a configuration of a processor 400 that may be employed in the image display apparatus 1000 of FIG. 1.

The image display apparatus 1000 includes a display device 100 that modulates light to form an image, a driver 200 that drives the display device 100 such that a position of the display device 100 varies, a light transmitter 300 that transmits an image formed by the display device 100 to the observer's eyes, and the processor 400 that controls the display device 100 and the driver 200 according to image information.

The display device 100 modulates the light according to the image information of the image to be provided to an observer to form the image. The image formed by the display device 100 may be provided to both eyes of the observer, and for convenience, only an optical system toward one eye is shown in the drawing. The image formed by the display device 100 may be, for example, a stereo image provided to each of the left and right eyes of the observer, a hologram image, a light field image, an integral photography (IP) image, etc., and may include a multi-view or super multi-view image. In addition, the image is not limited thereto and may be a general two-dimensional (2D) image.

The display device 100 may include, for example, a liquid crystal on silicon (LCoS) device, a liquid crystal display (LCD) device, an organic light emitting diode (OLED) display device, and a digital micromirror device (DMD), and also may include next-generation display devices such as a micro LED, a quantum dot LED, etc.

Although not illustrated in the image display apparatus 1000, a light source that provides the light for forming the image may be provided in the display device 100, and a configuration such as a beam splitter for adjusting an optical path, a relay lens for enlarging or reducing the image, a spatial filter for noise removal, etc. may be further provided.

The light transmitter 300 changes a path of the image formed by the display device 100, forms the image of a size suitable for the observer's field of vision, and transmits the image to the observers eye. The light transmitter 300 may include a focusing member 310 and may also include a beam splitter 330 as a member for diverting the light to change the path.

The focusing member 310 may include an image forming member having refractive power and may enlarge or reduce the image formed by the display device 100. The focusing member 310 is shown as a concave mirror, but is not limited thereto. The focusing member 310 may have a combination shape of a concave mirror, a convex lens, a concave lens, etc.

The beam splitter 330 may include a half mirror that transmits half of an incidence light and reflects the other half thereof. However, the beam splitter 330 is not limited thereto and may include a polarizing beam splitter that transmits or reflects the incidence light according to polarization. When the beam splitter 330 may include a polarizing beam splitter, additional optical elements for polarization conversion may be further provided in the light transmitter 300.

As shown, the focusing member 310 and the beam splitter 330 are fixed through a transparent light guide member 350 such that the light transmitter 300 may have an integral structure. However, this is an example and is not limited thereto.

The light transmitter 300 not only may transmit the light including the image formed by the display device 100 to the observers eye, but also may transmit the light including a real environment image of the front of the observer. Accordingly, the image display apparatus 1000 may function as a see-through type display.

The light transmitter 300 is not limited to the illustrated shape and configuration. An additional optical element may be further provided so as to transmit the image formed by the display device 100 to an observers pupil along with the real environment image of the front of the observer, and optical windows having various shapes and structures may be employed.

The light of the image formed by the display device 100 reaches the observers eye along a path such that the light passes through the beam splitter 330 and is reflected by the focusing member 310 and then reflected by the beam splitter 330. In this path, the observer recognizes a virtual image formed on a virtual image plane VP at a predetermined position of the rear of the beam splitter 330, and a sense of depth sensed by the observer varies depending on the position of the virtual image plane VP.

The image display apparatus 1000 according to an embodiment may not fix the position of the virtual image plane VP to one value but may change the position of the virtual image plane VP by reflecting the sense of depth of the image to be displayed. To this end, the image display apparatus 1000 includes the driver 200 for driving the position of the display device 100. The driver 200 may move the display device 100 in parallel such that a distance between the driver 200 and the focusing member 310 varies. When the position of the display device 100 varies in an A1 direction, the position of the virtual image plane VP varies in an A2 direction.

The driver 200 employed in the image display apparatus 1000 employs a shape variable material in order to widen the position driving range of the display device 100 in a volume as small as possible. That is, the driver 200 may be deformed according to an applied signal and provide driving force to the display device 100. For such shape variation, a material of which a shape varies by heat may be employed in the driver 200. The driver 200 may include a shape memory alloy (SMA) or an electro active polymer (EAP). An example of a detailed configuration of varying the position of the display device 100 by driving the driver 200 will be described later with reference to FIGS. 6 to 11.

The processor 400 may generate a light modulation signal SG1 to be transmitted to the display device 100 and a driving signal SG2 to be transmitted to the driver 200 according to image information related to an image to be perceived by the observer. The display device 100 and the driver 200 are controlled by the generated light modulation signal SG1 and the driving signal SG2, respectively. That is, the image is formed on the display device 100 by the light modulation signal SG1, and the position of the display device 100 is driven such that the virtual image plane VP set appropriately in accordance with the image is located.

The image display apparatus 1000 may also include a memory 500 and may store various data and codes of programs necessary for driving the image display apparatus 1000 in the memory 500 including the image information.

The processor 400 may include a light modulation signal generator 410 and a driving signal generator 480. The light modulation signal SG1 and the driving signal SG2 are generated by the light modulation signal generator 410 and the driving signal generator 480, respectively, with reference to the image information.

The image information may include data for each pixel related to color values of a plurality of pixels with respect to each of images of a plurality of frames to be provided to the observer, and include depth information related to the position of the virtual image plane VP on which each image is imaged.

The depth information included in the image information may be a previously determined representative depth value with respect to each of the images of the plurality of frames. This depth value may be set to one or more values.

The representative depth may be previously set from a salience map. A saliency map analysis may be performed to select a region that is highly likely to be viewed by the observer, that is, a region having a high visual concentration. Brightness, color, outline, object size, etc. may be considered to select the region having high visual concentration. For example, a region having a great difference in brightness or color, a region having a strong outline feature, and a region having a large size of an object compared to the surroundings may be areas of high visual concentration. A depth value corresponding to this region may be selected as the representative depth. Alternatively, a position with high visual concentration may be selected according to contents included in the image.

In addition, the representative depth may be set according to, for example, a frequency of each depth by analyzing a depth map and a color map of the image. Alternatively, the representative depth may be set through a zone of comfort (ZOC) analysis considering human visual perception characteristics.

The representative depth set as described above may be a successive value or may be a plurality of discrete values. That is, not all of values necessary for depth representation are used, but the representative depth may be set among discrete values obtained by quantizing these values at predetermined intervals. In the case of quantizing the depth value, when the representative depth value is selected for every frame for moving image representation, a variation of the representative depth value selected in successive frames may be reduced. Accordingly, the position variation of the display device 100 by the driver 200 may be reduced, and when the position of the virtual image plane VP changes in correspondence to the representative depth, the driving signal SG2 applied to the driver 200 may also be quantized and may be easily driven. When the same representative depth value is selected in the successive frames, the position driving of the display device 100 is not necessary, and thus, driving of the image display apparatus 1000 may be further simplified. The quantized depth value may be set to, for example, two depth values respectively representing near and far.

The light modulation signal generator 410 may generate an electric signal implementing the color value determined with reference to the data for each pixel included in the image information as the light modulation signal SG1.

The driving signal generator 480 may generate the driving signal SG2 for moving the position of the display device 100 such that the virtual image plane VP is formed on a position corresponding to the representative depth value set with reference to the depth information. The driving signal SG2 may be, for example, an electrical signal that generates heat suitable for deformation of the variable material of the driver 200.

The light modulation signal SG1 and the driving signal SG2 may be transmitted to the display device 100 and the driver 200, respectively, such that the corresponding image may be perceived by the observer from a changed position of the virtual image plane VP.

The driving signal SG2 for driving the driver 200 may be transmitted to be delayed by a predetermined time compared to the light modulation signal SG1. The predetermined time may be set to be equal to or greater than a convergence-accommodation time of the observers eye. This takes into account the time it takes for the human eye to perceive an image of a changed depth position.

Figure 3:
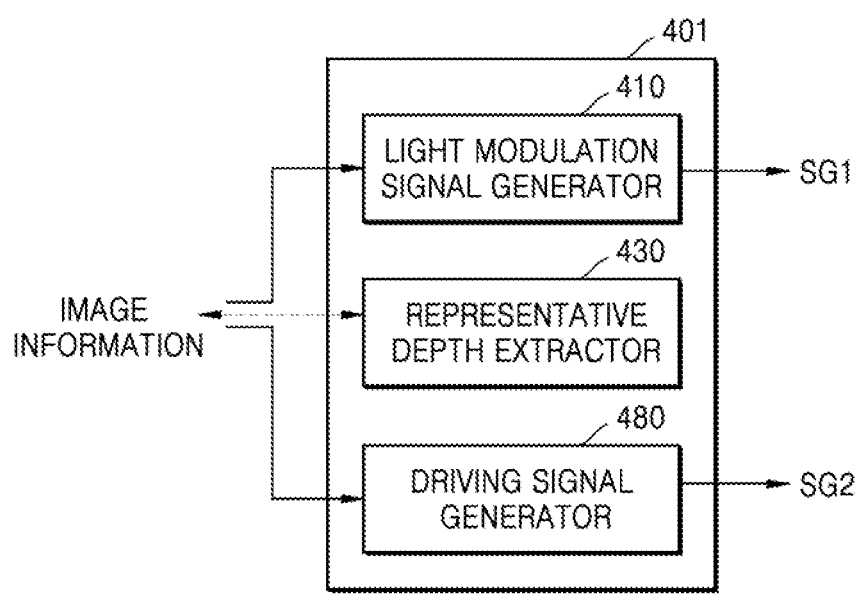
FIG. 3 is a block diagram illustrating another example of a configuration of a processor that may be employed in the image display apparatus of FIG. 1.

FIG. 3 is a block diagram illustrating another example of a configuration of a processor 401 that may be employed in the image display apparatus 1000 of FIG. 1.

The processor 401 may further include a representative depth extractor 430 together with the light modulation signal generator 410 and the driving signal generator 480.

In the description of FIG. 2, the image information is described as including previously set depth information, but is not limited thereto. The processor 401 may include the representative depth extractor 430. That is, the processor 401 extracts a representative depth for each image with reference to data for each pixel included in the image information and reflects the representative depth to the image information again. Referring to this, the driving signal generator 480 may generate the driving signal SG2.

Figure 4:
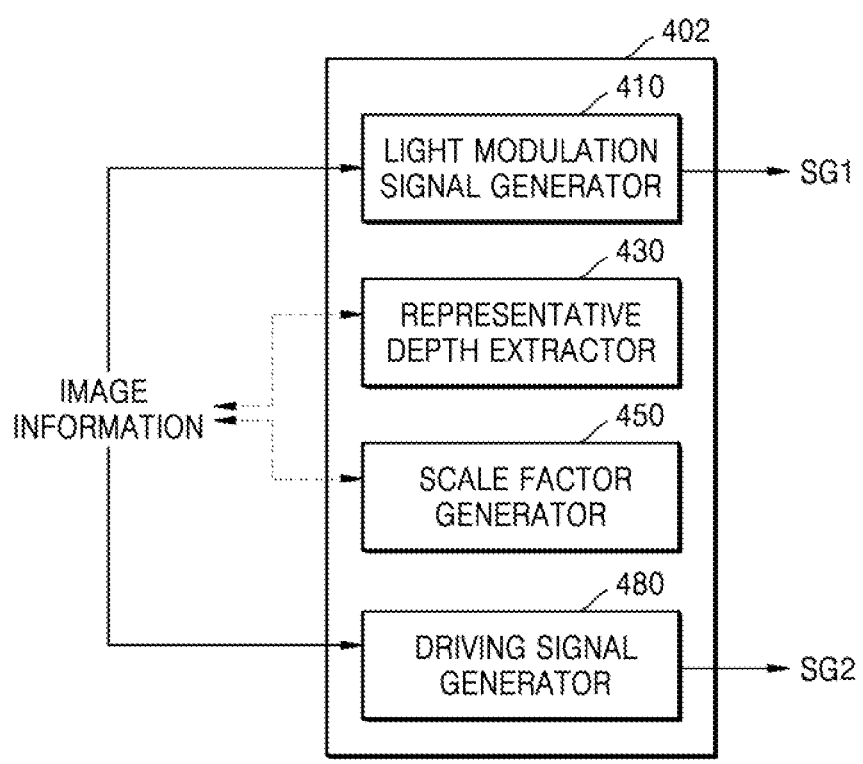
FIG. 4 is a block diagram illustrating another example of a configuration of a processor that may be employed in the image display apparatus of FIG. 1.
Figure 5:
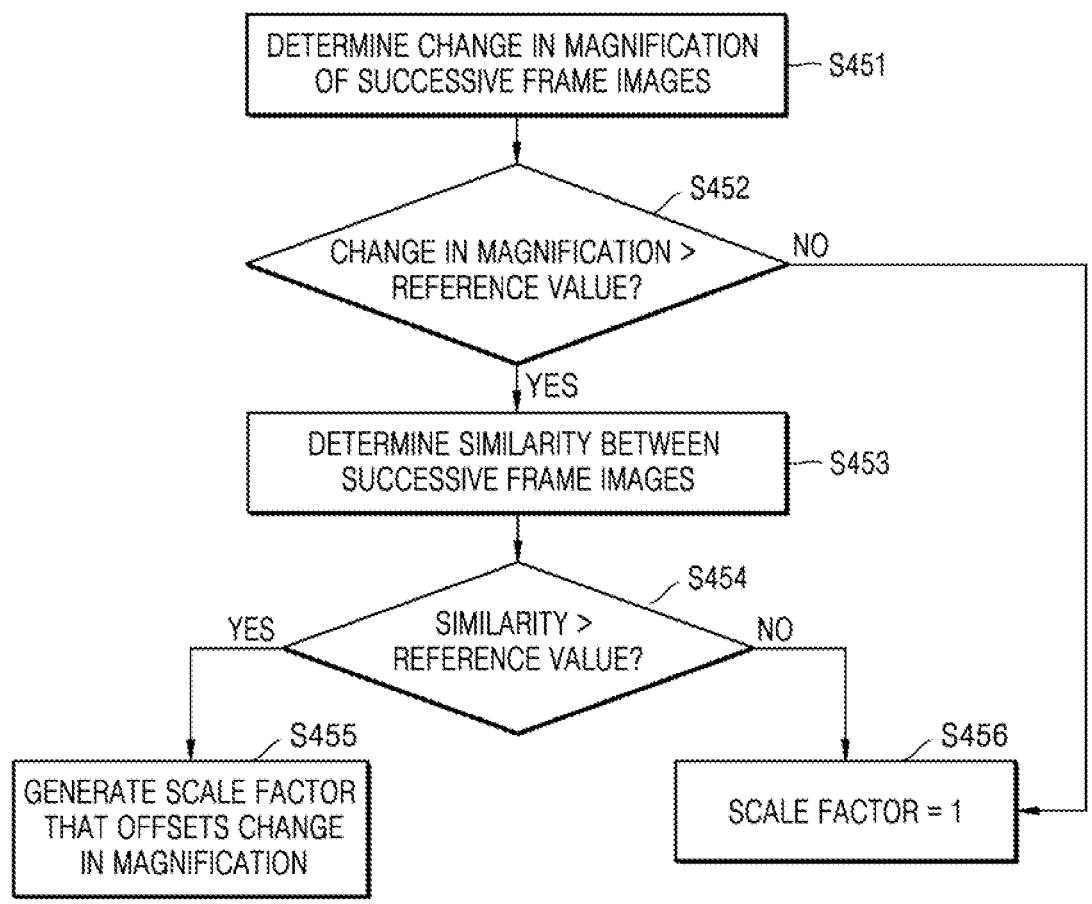
FIG. 5 is a flowchart illustrating an example of an operation of a scale factor generator included in the processor of FIG. 4.

FIG. 4 is a block diagram illustrating another example of a configuration of a processor 402 that may be employed in the image display apparatus 1000 of FIG. 1, and FIG. 5 is a flowchart illustrating an example of an operation of a scale factor generator 450 included in the processor 402 of FIG. 4.

The processor 402 may further include the scale factor generator 450 in addition to the light modulation signal generator 410, the driving signal generator 480, and the representative depth extractor 430.

The scale factor generator 450 generates a scale factor to be applied to any one of images of two consecutive frames having different depth information.

This is considered that when the images of the two consecutive frames have different virtual image planes VPs, the images of the two consecutive frames may exhibit different magnifications.

A magnification m is defined as follows.

$$\frac{d_i}{d_o} = \frac{\text{image distance}}{\text{object distance}} = m(\text{magnification})$$

wherein, $d_o$ denotes a distance from an image display surface of the display device 100 to the focusing member 310, and $d_i$ denotes a distance from the focusing member 310 to the virtual image plane VP. $d_i$ denotes a distance along an virtual light path, and the indicated distances $d_i$ and $d_i'$ include a distance from the center of the focusing member 310 to the center of the beam splitter 330 and a distance from the center of the beam splitter 330 to the virtual image plane VP.

When $d_o$ and $d_i$ are determined according to a position of the display device 100 and a position of the virtual image plane VP and the magnification at this time is m, a magnification m' corresponding to a changed position of the virtual image plane VP is $d_i'/d_o'$, which is different from m. This change in the magnification in the successive frame images may be felt to be awkward to an observer. In order to form a more natural sense of depth, the processor 402 may form an image on the display device 100 by reflecting the scale factor that may offset the change in the magnification to the image information.

The scale factor does not have to be applied to all successive frame images having different magnifications, and may be applied when a magnification change value is larger than a predetermined reference value. In addition, even when the magnification change value is large, the application of the scale factor may not be required for images of other scenes which are not related to each other. Considering this situation, the scale factor may be set and applied.

Referring to FIG. 5, in order to generate the scale factor, the scale factor generator 450 determines the change in the magnification of the images of the two consecutive frames (S451). That is, the scale factor generator 450 computes magnifications m1 and m2 of each of the images of the two consecutive frames and calculates a change value. The change value may be defined, for example, as a ratio m2/m1 or a difference m2-m1.

Next, the scale factor generator 450 compares the calculated change value between the two magnifications m1 and m2 with a predetermined reference value (S452).

If the change value between the two magnifications m1 and m2 is less than or equal to the predetermined reference value, the scale factor generator 450 sets the scale factor to 1 (S456).

Otherwise, when the change value between the two magnifications m1 and m2 is larger than the predetermined reference value, the scale factor generator 450 determines a similarity of the images of the two frames (S453). In order to determine the similarity of the images, a numerical value defined according to a predetermined determination reference may be compared. The numerical value is referred to as the similarity. The similarity may be defined based on a pixel value, or may be defined by other reference suitable for image comparison.

Even when the change in the magnification is large, the scale factor may not be applied with respect to an unrelated scene. This is because an observer may feel the change in the magnification naturally as part of a scene change. When the similarity of the compared images of the two frames is equal to or less than a predetermined reference value, the scale factor generator 450 may set the scale factor to 1 (S456).

When the similarity of the compared images of the two frames is larger than the predetermined reference value, the scale factor generator 450 may generate the scale factor that offsets the magnification change value (S455). For example, when the change value is set as a ratio, the scale factor may be set to a value inversely proportional to the magnification change value.

As such, the scale factor set by the scale factor generator 450 is reflected to the image information again, and the light modulation signal generator 410 generates a light modulation signal with reference thereto.

As described with reference to FIG. 3, the representative depth extractor 430 may set the representative depth from the image information and reflect the representative depth to the image information as depth information. Referring to the representative depth, the driving signal generator 480 may generate the driving signal SG2.

The processor 402 illustrated in FIG. 4 includes the representative depth extractor 430 together with the scale factor generator 450 but this is an example. The processor 402 does not have to include the representative depth extractor 430 and the scale factor generator 450 together. For example, a representative depth set by another processor or the like may be previously included in the image information as the depth information. In addition, the scale factor may be set by another processor or the like and previously included in the image information.

Figure 6:
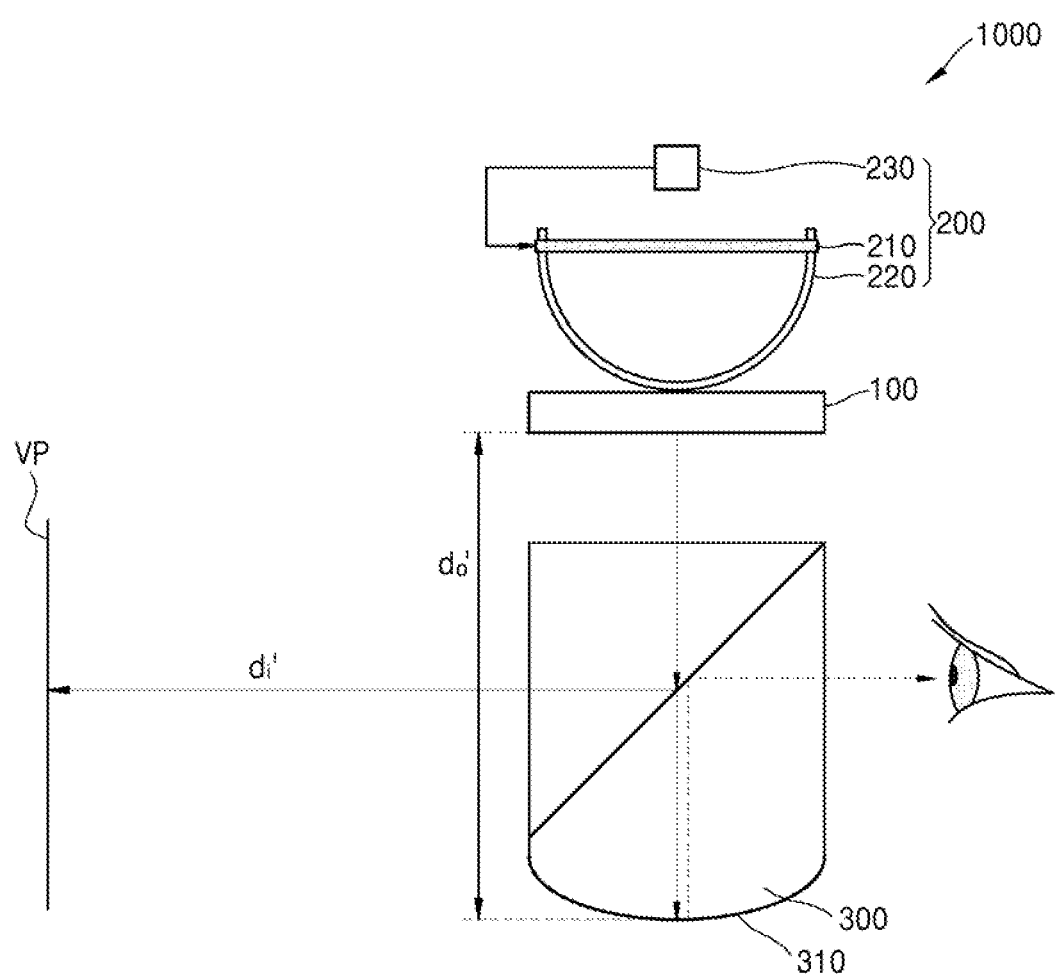
FIGS. 6 and 7 illustrate an example that a display device and image plane positions change according to deformation of a driver together with an example of a structure of the driver in the image display apparatus of FIG. 1.
Figure 7:
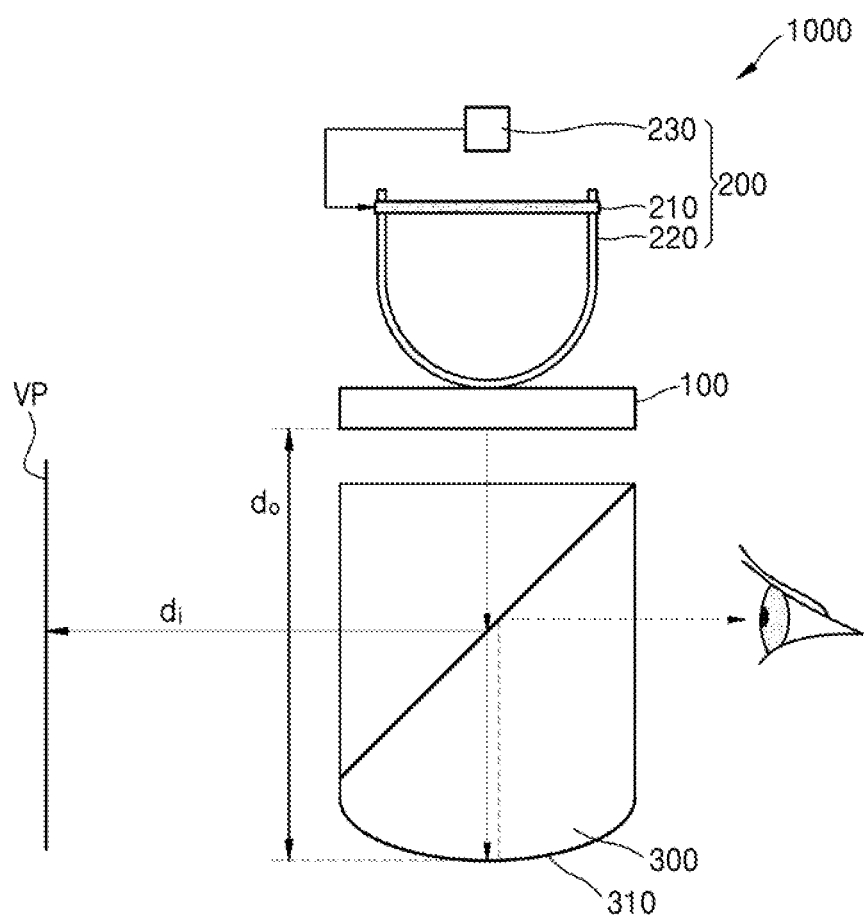
Figure 8:
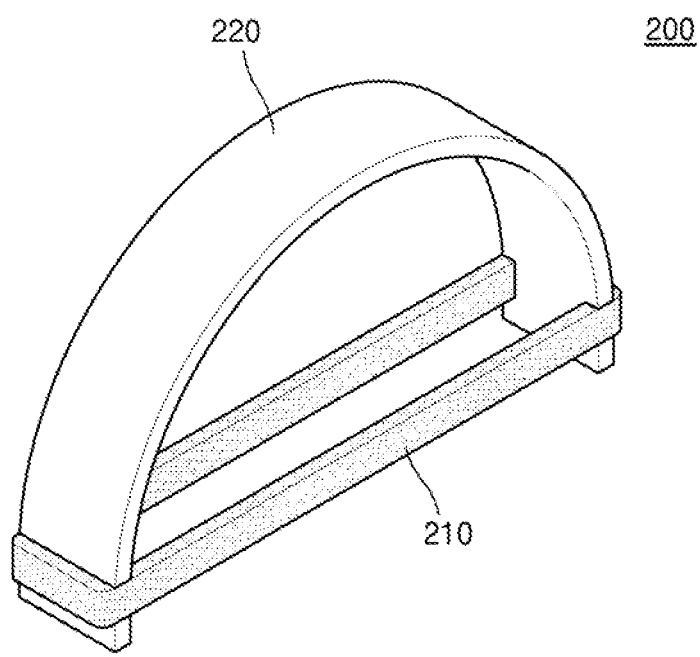
FIG. 8 is a perspective view illustrating a detailed shape of the driver of FIGS. 6 and 7.

FIGS. 6 and 7 illustrate an example that the display device 100 and the image plane positions change according to deformation of the driver 200 together with an example of a structure of the driver 200 in the image display apparatus 1000 of FIG. 1. FIG. 8 is a perspective view illustrating a detailed shape of the driver 200 of FIGS. 6 and 7.

Referring to FIGS. 6 and 7, the driver 200 may include a deformation portion 210, a bridge portion 220, and a driving controller 230. The deformation portion 210 may have a wire shape. The length of the deformation portion 210 may vary depending on the temperature of the deformation portion 210 or an electric field formed in the deformation portion 210. For example, the deformation portion 210 may include an SMA, an EAP, and a combination thereof. When the deformation portion 210 includes an SMA, the deformation portion 210 may have a short length at a high temperature and may have a long length at a low temperature. When the deformation portion 210 includes an EAP and when the electric field is applied to the deformation portion 210, the length of the deformation portion 210 may increase in a direction perpendicular to the applied electric field. Hereinafter, an example that the deformation portion 210 is deformed by the temperature will be described.

As shown in FIG. 8, the bridge portion 220 includes a plate shape member extending in one direction and provided with recess regions facing each other at both ends. The bridge portion 220 may have elasticity and may be bent by the deformation portion 210 to have an arch shape. The deformation portion 210 may be fitted into the recess regions of the bridge portion 220 and may have a shape surrounding an end of the bridge portion 220. When the deformation portion 210 winds both ends of the bridge portion 220, the recess regions of the bridge portion 220 fix the deformation portion 210, and thus, positions of the deformation portion 210 and the bridge portion 220 may be aligned.

The temperature of the deformation portion 210 may be adjusted by an electrical signal applied to the deformation portion 210. The electrical signal may be applied by the driving controller 230. The driving controller 230 may apply the electrical signal to the deformation portion 210 according to the driving signal SG2 transmitted from the processor 400. The electrical signal may be a current signal or a voltage signal. For example, a current is applied to the deformation portion 210 by the driving controller 230 to increase the temperature of the deformation portion 210. When no current is applied to the deformation portion 210, the temperature of the deformation portion 210 may be lowered.

A degree of bending of the bridge portion 220 may vary according to a change in the length of the deformation portion 210. When the length of the deformation portion 210 decreases, the degree of bending of the bridge portion 220 may increase. Accordingly, a distance between the display device 100 and the focusing member 310 may decrease. When the length of the deformation portion 210 increases, the degree of bending of the bridge portion 220 may be reduced. Accordingly, the distance between the display device 100 and the focusing member 310 may increase.

Referring to FIG. 6, the driving controller 230 may not apply a current to the deformation portion 210. In this state, the display device 100 may be spaced apart from the focusing member 310 by the distance $d_o'$, and a distance on an optical path from the focusing member 310 to the virtual image plane VP may be $d_i'$.

Referring to FIG. 7, the current may be applied to the deformation portion 210 to increase the temperature of the deformation portion 210. The current may be applied by the driving controller 230. Accordingly, the length of the deformation portion 210 may decrease. The temperature of the deformation portion 210 may be controlled such that a degree of change in the length of the deformation portion 210 may be adjusted.

When the length of the deformation portion 210 decreases, the degree of bending of the bridge portion 220 may increase. In this deformation process, the bridge portion 220 may push the display device 100 to place the display device 100 close to the light transmitter 300. The distance between the display device 100 and the focusing member 310 may decrease to $d_o$, and the distance between the virtual image plane VP and the focusing member 310 may decrease to $d_i$.

Referring back to FIG. 6, when the driving controller 230 does not apply current to the deformation portion 210 again, the temperature of the deformation portion 210 may be lowered and the length thereof may increase again. The degree of bending of the bridge portion 220 may be reduced. The distance between the display device 100 and the focusing member 310 may increase again to $d_o$, and the distance between the virtual image plane VP and the focusing member 310 may decrease again to $d_i'$.

Figure 9:
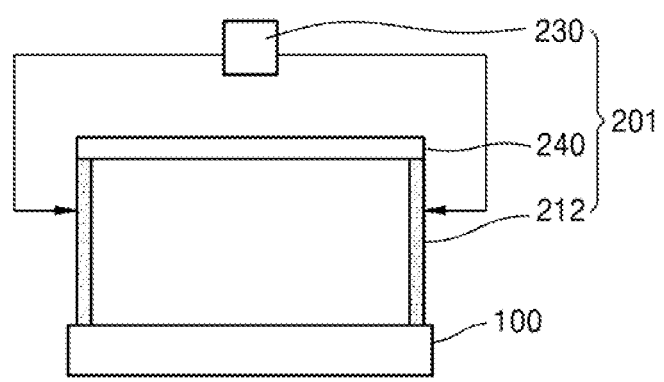
FIG. 9 illustrates an example of a configuration of a driver that may be employed in the image display apparatus of FIG. 1.
Figure 10:
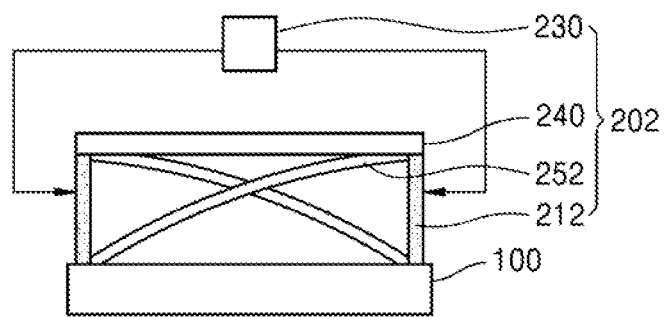
FIG. 10 illustrates another example of a configuration of a driver that may be employed in the image display apparatus of FIG. 1.
Figure 11:
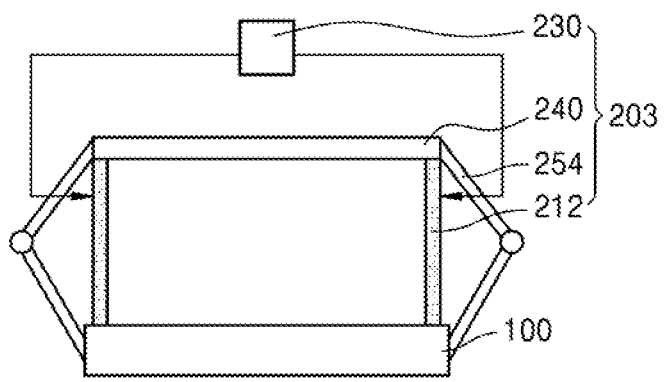
FIG. 11 illustrates another example of a configuration of a driver that may be employed in the image display apparatus of FIG. 1.

FIGS. 9 to 11 illustrate examples of configurations of drivers 201, 202, and 203 that may be employed in the image display apparatus 1000 of FIG. 1.

Referring to FIG. 9, the driver 201 may include deformation portions 212, a support portion 240, and the driving controller 230. Each of the deformation portions 212 may be substantially the same as the deformation portion 210 described with reference to FIG. 8 except for a position and a shape thereof.

The deformation portions 212 may be disposed between the support portion 240 and the display device 100. Both ends of each of the deformation portions 212 may be in contact with the support portion 240 and the display device 100, respectively. A pair of deformation portions 212 is shown, but this is an example. In other embodiments, one deformation portion 212 or three or more deformation portions 212 may be provided.

The driving controller 230 may be electrically connected to the deformation portions 212 to apply an electrical signal to each of the deformation portions 212. For example, the driving controller 230 may apply a current to the deformation portions 212.

When the electrical signal is applied to the deformation portions 212 and the temperature of each of the deformation portions 212 increases, the length of each of the deformation portions 212 may decrease. In this case, the display device 100 is closer to the support portion 240, that is, a distance from the display device 100 to the focusing member 310 increases.

By controlling the temperature of each of the deformation portions 212, a degree of change in the length of each of the deformation portions 212 may be adjusted and the distance between the display device 100 and the focusing member 310 may be controlled.

Referring to FIG. 10, the driver 202 may include the deformation portions 212, the support portion 240, restoration portions 252, and the driving controller 230. The deformation portions 212, the support portion 240, and the driving controller 230 may be substantially the same as those described with reference to FIG. 9.

The restoration portions 252 may be provided between the support portion 240 and the display device 100. The restoration portions 252 may extend from the support portion 240 to the display device 100. The restoration portions 252 may extend to cross each other. Both ends of each of the restoration portions 252 may be in contact with the support portion 240 and the display device 100, respectively. The restoration portions 252 may have elasticity. For example, each of the restoration portions 252 may include a rod including carbon. When the restoration portions 252 are bent, the restoration portions 252 may have a restoring force to be restored to a state before bent again.

When an electrical signal is applied to the deformation portions 212, the temperature of each of the deformation portions 212 increases, the length of each of the deformation portions 212 decreases, and the restoration portions 252 are bent. Accordingly, the display device 100 receives a driving force moving toward the support portion 240, and the distance between the display device 100 and the focusing member 310 increases. The temperature of the deformation portions 212 may be controlled such that the degree of change in the length of each of the deformation portions 212 may be adjusted, and the distance between the display device 100 and the focusing member 310 may be controlled.

The restoration portions 252 have the restoring force, and thus, when the applied electrical signal disappears, the restoration portions 252 may be restored to the original state according to an increase in the length of each of the deformation portions 212. The restoring force may act in a direction in which a distance between the display device 100 and the support portion 240 increases, and accordingly, the distance between the display device 100 and the focusing member 310 may decrease.

Referring to FIG. 11, the driver 203 may include deformation portions 212, the support portion 240, restoration portions 254, and the driving controller 230. The deformation portions 212, the support portion 240, and the driving controller 230 may be substantially the same as those described with reference to FIG. 9.

The restoration portions 254 may be provided between the support portion 240 and the display device 100. The restoration portions 254 may include a torsion spring. When the restoration portions 254 are twisted, the restoration portions 254 may have a restoring force to be restored to a state before twisted. Both ends of each of the restoration portions 254 may be in contact with the support portion 240 and the display device 100, respectively.

When the electrical signal is applied to the deformation portions 212, the temperature of each of the deformation portions 212 may increase, the length of each of the deformation portions 212 may decrease, and the display device 100 and the support portion 240 may be close to each other. As the display device 100 and the support portion 240 are close to each other, the restoration portions 254 may be twisted. Accordingly, the display device 100 is far away from the focusing member 310. By controlling the temperature of each of the deformation portions 212, the degree of change in the length of each of the deformation portions 212 may be adjusted and the distance between the display device 100 and the focusing member 310 may be controlled.

The restoration portions 254 have a restoring force to return to an initial state, and thus, when the applied electric signal disappears, the restoration portions 254 may be restored to the original state according to an increase in the length of the deformation portions 212. The restoring force may act in a direction in which the distance between the display device 100 and the support portion 240 increases. Accordingly, the distance between the display device 100 and the focusing member 310 may decrease.

As described above, the drivers 200, 201, 202, and 203 that may be provided in the image display apparatus 1000 according to the embodiment may employ a shape variable material to have a small volume and increase a position driving range of the display device 100. The driving range of the display device 100 may be within about 1 mm. When the driving range is implemented by, for example, a voice coil motor, a piezo actuator, or the like, a volume increase is very large, whereas in the embodiment, the driving range may be implemented with a volume smaller than these.

Figure 12:
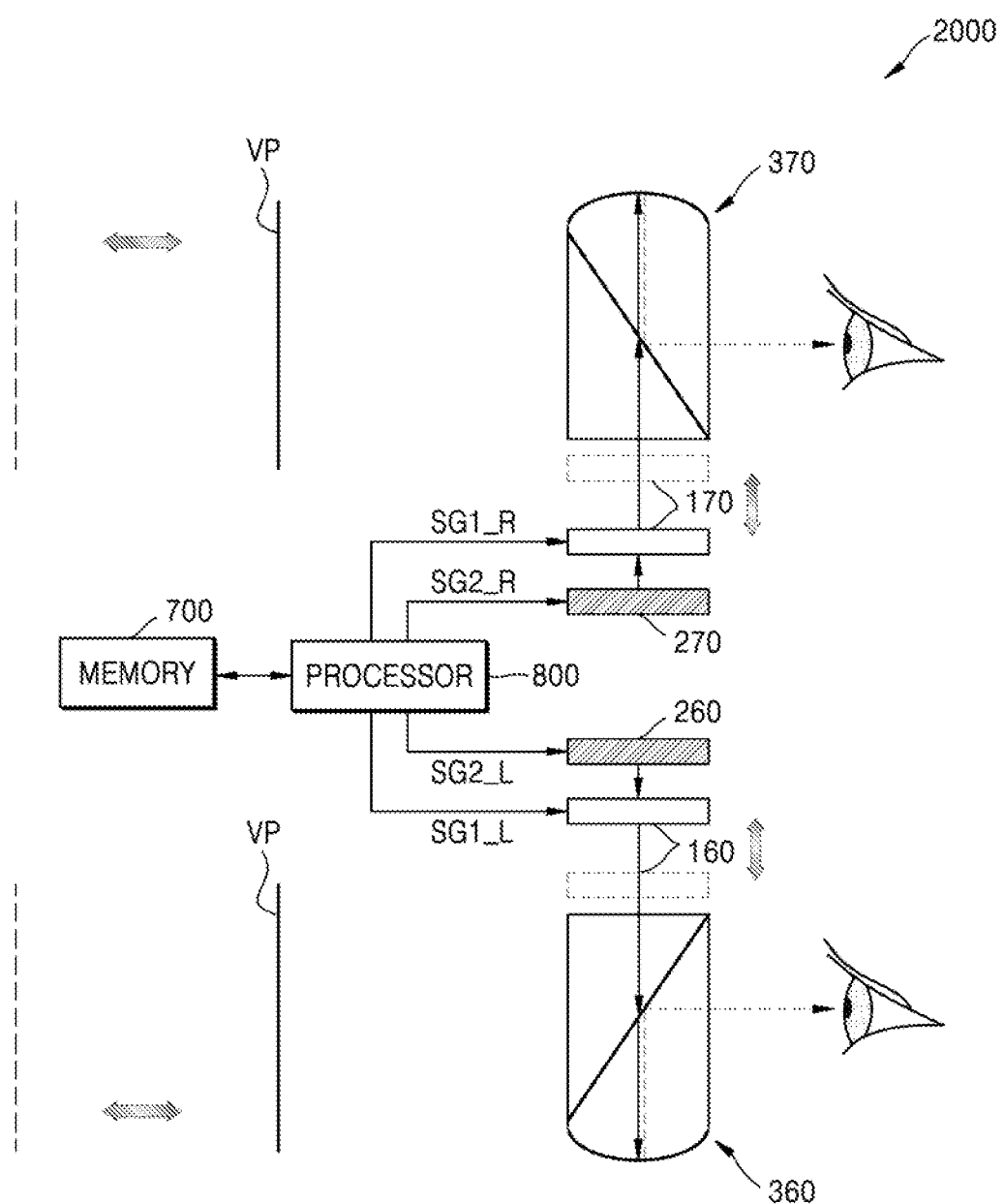
FIG. 12 illustrates a configuration and an optical arrangement of an image display apparatus according to another embodiment.
Figure 13:
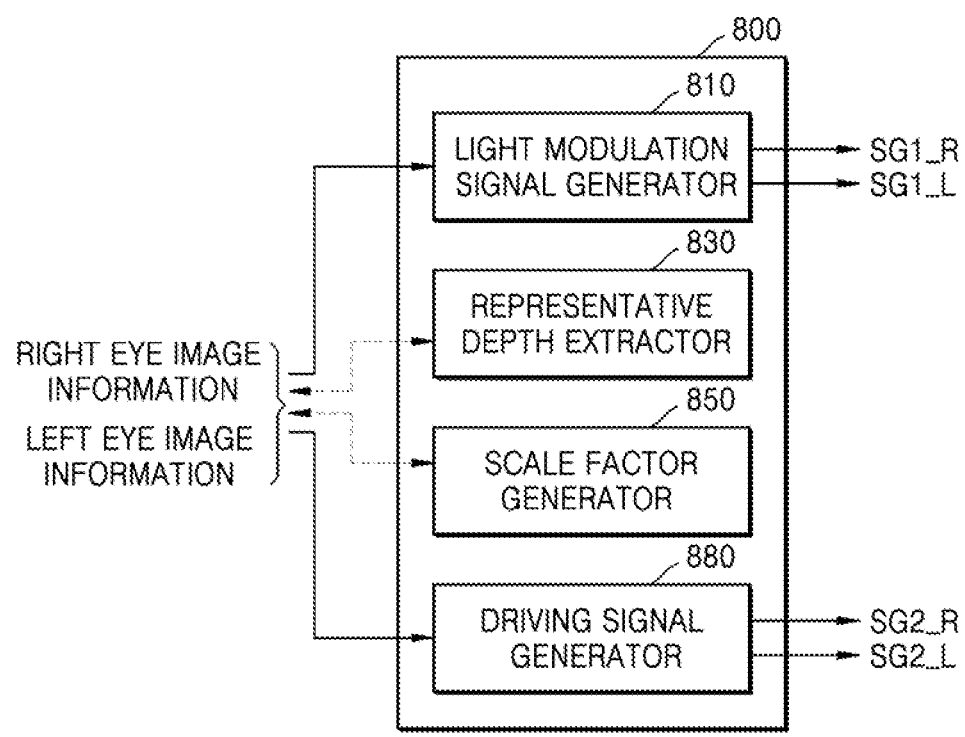
FIG. 13 is a block diagram illustrating an example of a configuration of a processor included in the image display apparatus of FIG. 12.

FIG. 12 illustrates a configuration and an optical arrangement of an image display apparatus 2000 according to another embodiment. FIG. 13 is a block diagram illustrating an example of a configuration of a processor 800 included in the image display apparatus 2000 of FIG. 12.

The image display apparatus 2000 may include a first display device 160, a first driver 260, a first light transmitter 360, a second display device 170, a second driver 270, and a second light transmitter 370.

The first driver 260 and the second driver 270 drive positions of the first display device 160 and the second display device 170, respectively, and the first light transmitter 360 and the second light transmitter 370 transmit images formed by the first display device 160 and the second display device 170 to the left and right eyes of an observer, respectively.

The image display apparatus 2000 further includes the processor 800 and a memory 700. The processor 800 controls the first display device 160, the second display device 170, the first driver 260, and the second driver 270 according to image information stored in the memory 700. The processor 800 may include a light modulation signal generator 810 and a driving signal generator 880. Program codes for executing the light modulation signal generator 810 and the driving signal generator 880 may be stored in the memory 700.

The image information stored in the memory 700 may include information about a pair of a left eye image and a right eye image that may be perceived as 3D images of one frame. The left eye image and the right eye image have a predetermined disparity. The processor 800 generates light modulation signals SG1_L and SG1_R such that the left eye image is formed on the first display device 160 and the right eye image is formed on the second display device 170 and accordingly, controls the first display device 160 and the second display device 170.

The image information may further include depth information related to positions of the virtual image plane VP on which the left eye image and the right eye image are to be imaged, and the processor 800 generates driving signals SG2_L and SG2_R such that the virtual image plane VP is formed according to the depth information, that is, on a set depth position and controls the first driver 160 and the second driver 270.

The depth information may be previously set with respect to an image of each frame and stored in the memory 700, or the set depth information may be reflected to the image information according to execution of a representative depth extractor 830 included in the processor 800.

The processor 800 may also include a scale factor generator 850 in addition to the light modulation signal generator 810 and the representative depth extractor 830, and the driving signal generator 880.

The scale factor generator 850 differs only in generating a scale factor according to a change in the magnification between successive frame images with respect to left eye image information and right eye image information respectively provided for both eyes and is substantially the same as the scale factor generator 450 described with reference to FIGS. 4 and 5.

The image display apparatus 2000 according to the embodiment may express a 3D image by combining a binocular disparity method and a depth expression. For an image including an object of a predetermined depth position, a vergence accommodation conflict (VAC) may be reduced by adjusting a position of the virtual image plane VP on which the image is imaged. In addition, an image in which objects are present at various depth positions may be formed on the virtual image plane VP, for example, using a depth position of a main object determined according to the salience map as the representative depth position, and the remaining sense of depth may be expressed in binocular parallax such that a 3D image may be perceived. In addition, as the representative depth position, only two values identified as near and far in an image of a plurality of frames may be used. Since the image display apparatus 2000 according to the embodiment utilizes both the binocular parallax and the scale factor, a natural depth expression with less eye fatigue of the observer is possible even by using only two types of depth values. In the above-described image display apparatuses 1000 and 2000, an eye tracking module tracking an observer's gaze may be further applied, and information measured by the eye tracking module may be used to generate a driving signal driving a position of a display device.

Figure 14:
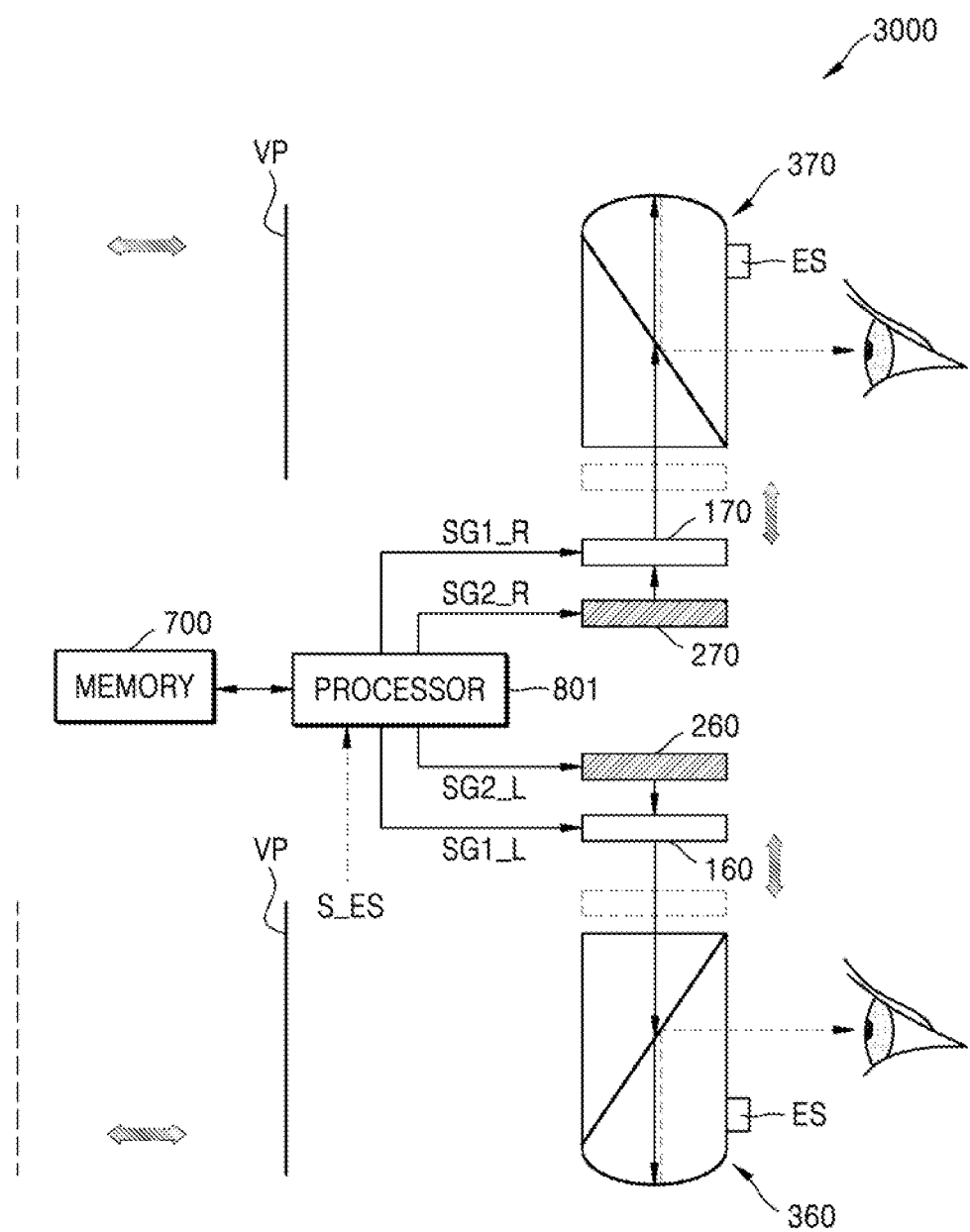
FIG. 14 is a diagram illustrating a configuration and an optical arrangement of an image display apparatus according to another embodiment.
Figure 15:
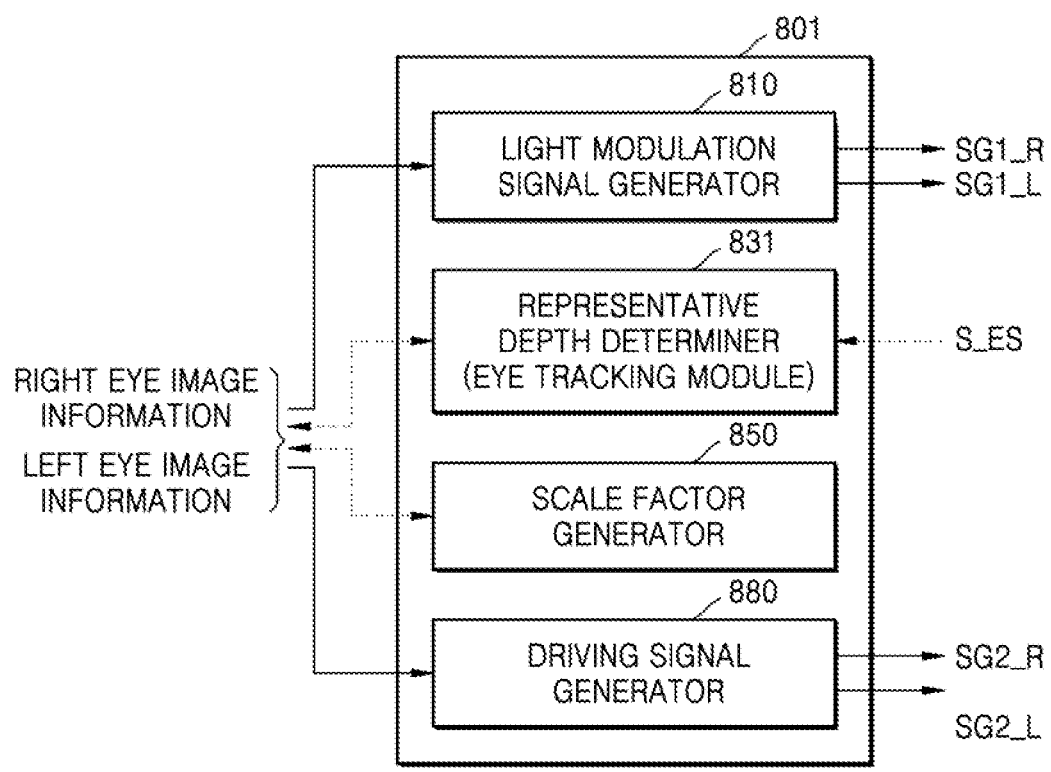
FIG. 15 is a block diagram illustrating an example of a configuration of a processor that may be employed in the image display apparatus of FIG. 14.

FIG. 14 is a diagram illustrating a configuration and an optical arrangement of an image display apparatus 3000 according to another embodiment. FIG. 15 is a block diagram illustrating an example of a configuration of a processor that may be employed in the image display apparatus 3000 of FIG. 14.

The image display apparatus 3000 of the present embodiment is different from the image display apparatus 2000 of FIG. 12 in that the image display apparatus 3000 further includes an eye tracking sensor ES, and a processor 801 processes a signal S_ES sensed by the eye tracking sensor ES and generates driving signals SG2_R and SG2_L. Hereinafter, the differences will be mainly described.

The image display apparatus 3000 may include a first display device 160, a first driver 170, a first light transmitter 360, a second display device 260, and a second driver 270, and a second light transmitter 370. As described above, the first driver 260 and the second driver 270 may have a structure of any one of the drivers 200, 201, 202, and 203 employing a shape variable material, or combined or modified therefrom. The first driver 260 and the second driver 270 may drive positions of the first display device 160 and the second display device 170, respectively, and the first light transmitter 360 and the second light transmitter 370 may transmit images formed by the first display device 160 and the second display device 170, respectively, to observer's left eye and right eye.

The image display apparatus 3000 may also include the eye tracking sensor ES that tracks an observer's gaze. The eye tracking sensor ES may sense an actual position and a rotation angle of the pupil, and may sense a vergence position of both eyes. The signal S_ES sensed by the eye tracking sensor ES may be transmitted to the processor 801, and an eye tracking module included in the processor 801 may calculate a depth position that an observer views.

FIGS. 14 and 15 illustrate that the two eye tracking sensors ES are disposed in the first light transmitter 360 and the second light transmitter 370, respectively, but the present disclosure is not limited thereto. The eye tracking sensors ES may be disposed in other suitable positions at which the pupil positions of both eyes may be sensed, and the number thereof may be changed.

Referring to FIG. 15, the processor 801 may include a light modulation signal generator 810, a driving signal generator 880, and a representative depth determiner 831, and may further include a scale factor generator 850. The representative depth determiner 831 may include the eye tracking module that processes the signal S_ES sensed by the eye tracking sensor ES and determines the depth position that the observer views, and a program code for execution of the eye tracking module may be stored in the memory 700.

Figure 16:
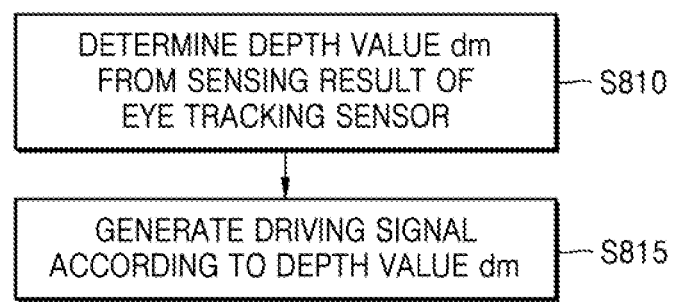
FIG. 16 is a flowchart illustrating an example of a process, performed by the processor of FIG. 15, of generating driving signal.

FIG. 16 is a flowchart illustrating an example of a process, performed by the processor 801 of FIG. 15, of generating the driving signals SG2_R and SG2_L.

The representative depth determiner 831 processes a signal sensed by the eye tracking sensor ES and determines a depth value dm corresponding to depth position that an observer views (S810), and then, based on the determined depth value dm, generates the driving signals SG2_R and SG2_L (S815). That is, the driving signals SG2_R and SG2_L used to change positions of the display devices 160 and 170 are generated so that a virtual image plane VP is formed on a position corresponding to the determined depth value dm, and are transmitted to the first driver 260 and the second driver 270.

Figure 17:
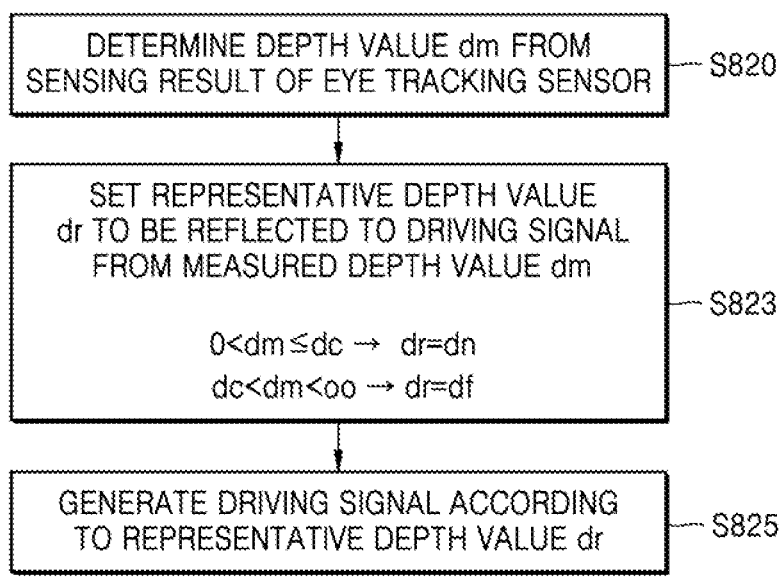
FIG. 17 is a flowchart illustrating another example of a process, performed by the processor of FIG. 15, of generating driving signal.

FIG. 17 is a flowchart illustrating another example of a process, performed by the processor 801 of FIG. 15, of generating the driving signals SG2_R and SG2_L.

The representative depth determiner 831 processes a signal sensed by the eye tracking sensor ES and determines the depth value dm corresponding to the depth position that an observer views (S820), and then, sets a representative depth value dr to be reflected in the generation of the driving signals SG2_R and SG2_L from the determined depth value dm (S823). The representative depth value dr may be determined as one of two values dn and df respectively representing previously set near range and far range. In such setting, the two representative values dn and df, and a depth value dc serving as a criterion identifying the near range and the far range may be determined in advance. When the depth value dm determined by the eye tracking sensor ES is smaller than dc (0<dm<dc), dn may be determined as the representative depth value dr. When the depth value dm determined by the eye tracking sensor ES is greater than dc (dc<dm<∞), df may be determined as the representative depth value dr. When the depth value dm determined by the eye tracking sensor ES is equal to dc, dn or df may be determined as the representative depth value dr.

Next, based on the determined representative depth value dr, the driving signals SG2_R and SG2_L are generated (S825). That is, the driving signals SG2_R and SG2_L used to change positions of the display devices 160 and 170 are generated so that the virtual image plane VP is formed on a position corresponding to the determined depth value dm, and are transmitted to the first driver 260 and the second driver 270.

Even the sense of depth is expressed by using only two depth values representing two ranges identified as near and far as described above, the image display apparatus 3000 according to the embodiment utilizes a binocular parallax and a scale factor together, thereby reducing fatigue of observers eyes, and enabling a natural depth expression.

Figure 18:
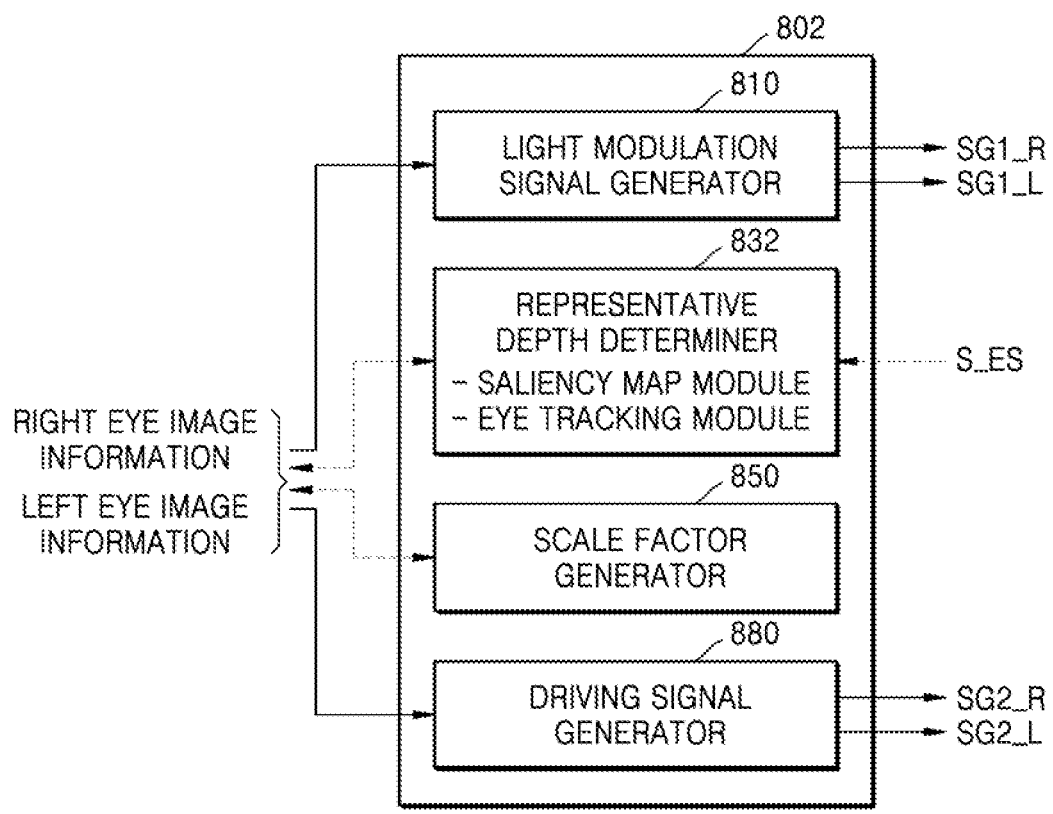
FIG. 18 is a block diagram illustrating another example of a configuration of a processor that may be employed in the image display apparatus of FIG. 14.
Figure 19:
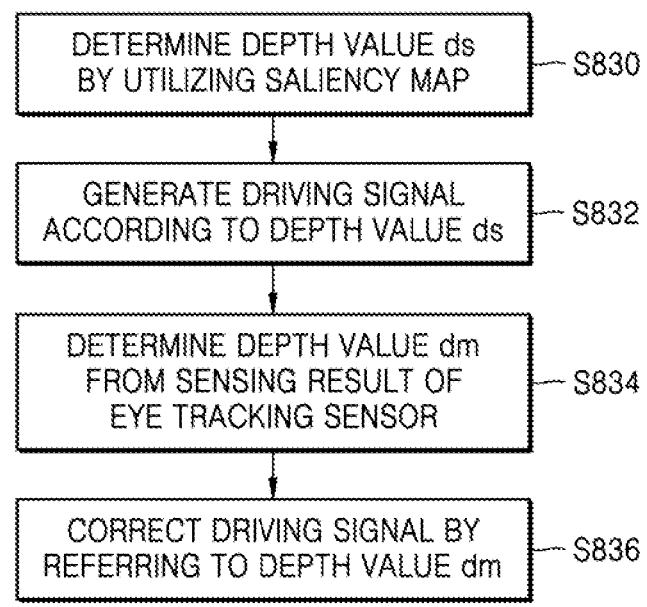
FIG. 19 is a flowchart illustrating an example of a process, performed by the processor of FIG. 18, of generating driving signal.

FIG. 18 is a block diagram illustrating another example of a configuration of a processor 802 that may be employed in the image display apparatus 3000 of FIG. 14. FIG. 19 is a flowchart illustrating an example of a process, performed by the processor 802 of FIG. 18, of generating the driving signals SG2_R and SG2_L.

The processor 802 may include the light modulation signal generator 810, the driving signal generator 880, and a representative depth determiner 832, and may further include the scale factor generator 850. The representative depth determiner 832 may include a saliency map module and an eye tracking module, that is, which may be utilized to generate the driving signals SG2_R and SG2_L.

Referring to FIG. 18, first, the depth value ds may be determined by using the saliency map module (S830). As described above, the saliency map analysis is to select a region with a high probability of an observer's attention, that is, a region with a high visual concentration. The depth value ds of the selected region may be determined as a representative depth value of the corresponding frame image. In order to select the region with high visual concentration, for example, brightness, color, outline, object size, etc. may be considered.

The driving signals SG2_R and SG2_L are generated according to the determined depth value ds (S832).

In addition, the depth value dm is determined from a sensing result of the eye tracking sensor ES (S834). Next, the driving signals SG2_R and SG2_L are corrected with reference to the determined depth value dm.

Such a process is to reflect the case that unlike the result of the saliency map analysis, the observer intentionally focuses his or her gaze on another region, to driving of a position of a display device. For example, although the position of the display device is driven so that an image is displayed on a position of a virtual position suitable for a viewing region expected by the saliency map analysis, when the observer views another region, visual fatigue may be accompanied due to the vergence-accommodation mismatch. In addition, as a depth difference between the expected viewing position and an actual viewing position increases, fatigue may increase. Therefore, while a representative depth is set for each of a plurality of frame images by utilizing the saliency map analysis, a more natural depth expression is possible by correcting the driving signals SG2_R and SG2_L by referring to the sensing result of the eye tracking sensor ES.

When the depth value ds is determined by utilizing the saliency map, the depth value may be determined as one of two representative values representing a near range and a far range, rather than a successive value. In this case, the driving signals SG2_R and SG2_L are corrected only when the depth value ds determined by the saliency map analysis and the depth value dm determined by the eye tracking sensor ES belong to different ranges. That is, the driving signals SG2_R and SG2_L are corrected only when the observer views a far region with respect to an image that is expected to view the near region, or vice versa. In other words, even when there is a slight difference between the expected viewing region set in the saliency map and the actual viewing region, the driving signals SG2_R and SG2_L are not corrected when the two regions are within the same range. As described above, the natural depth expression is possible while driving a driver as simple as possible by combining the saliency map and gaze tracking of the observer.

The image display apparatuses 1000, 2000 and 3000 described above may be configured in a wearable form. All or some of components of the image display apparatuses 1000 and 2000 may be configured in a wearable form.

For example, the image display apparatuses 1000, 2000 and 3000 may be applied in the form of a head mounted display (HMD). In addition, the image display apparatuses 1000 and 2000 are not limited thereto, and may be applied to a glasses-type display or a goggle-type display.

The image display apparatuses 1000, 2000 and 3000 described above may be applied to implement augmented reality (AR) in that both an image formed on a display device and an image of the real world may be shown to an observer.

The AR may further increase an effect of reality by showing a virtual object or information combined on an environment of the real world. For example, at a position of the observer, an image forming unit may form additional information about the environment provided by the real world and provide the additional information to the observer. An AR display may be applied to a ubiquitous environment or an internet of things (IoT) environment.

The image of the real world is not limited to a real environment, and may be, for example, an image formed by another image device. Accordingly, the image display apparatuses described above may be applied to multi image display apparatuses that display two images together.

The image display apparatuses 1000, 2000 and 3000 described above may operate in synchronization with or in connection to other electronic devices such as a smart phone. For example, a processor for driving the image display apparatuses 1000, 2000 and 3000 may be provided in the smart phone. In addition, the image display apparatuses 1000, 2000 and 3000 described above may be provided in a smart phone.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An image display apparatus comprising:
a display device configured to modulate light to form an image;
a driver configured to drive the display device such that a position of the display device varies;
a light transmitter configured to transmit the image formed by the display device to an observer's eye and comprising a focusing member; and
a processor configured to;
generate driving signal based on image information, wherein the image information comprises depth information related to the position of a virtual image plane with respect to each of a plurality of images,
generate a scale factor to be applied to any one of two successive images with different depth information from among the plurality of images,
generate a light modulation signal based on the image information and the scale factor, and
control the display device and the driver according to the light modulation signal and the driving signal, respectively.

2. The image display apparatus of claim 1, wherein the driver is further configured to move the display device in parallel such that a distance between the display device and the focusing member varies.

3. The image display apparatus of claim 1, wherein the driver comprises a shape variable portion which is deformable according to an applied signal to provide a driving force to the display device.

4. The image display apparatus of claim 3, wherein the shape variable portion comprises a material of which a shape varies by heat.

5. The image display apparatus of claim 3, wherein the shape variable portion comprises a shape memory alloy or an electro active polymer.

6. The image display apparatus of claim 1, wherein the light transmitter is further configured to transmit the image formed by the display device to the observer's eye as an enlarged image on the virtual image plane at a predetermined position.

7. The image display apparatus of claim 1, wherein the depth information comprises information previously set from a saliency map with respect to each of the images of the plurality of frames.

8. The image display apparatus of claim 1, wherein the processor is further configured to:
compute a magnification at which each of the two successive images is imaged, and
based on a change value between the magnifications at which each of the two successive images is imaged being equal to or less than a predetermined reference value, set the scale factor to 1.

9. The image display apparatus of claim 1, wherein the processor is further configured to:
compute a magnification at which each of the two successive images is imaged, and
based on the change value between the magnifications at which each of the two successive images is imaged being larger than a predetermined reference value, determine a similarity of the two successive images.

10. The image display apparatus of claim 9, wherein the processor is further configured to:
based on the similarity of the two successive images being equal to or less than a the predetermined reference value, set the scale value to 1, and
based on the similarity of the two successive images being larger than the predetermined reference value, generate a scale factor that offsets the change value.

11. The image display apparatus of claim 1, wherein the processor is further configured to transmit the driving signal based on a predetermined time delay compared to transmission of the light modulation signal.

12. The image display apparatus of claim 11, wherein the predetermined time delay is equal to or greater than a convergence-accommodation time of the observer's eye.

13. The image display apparatus of claim 1, wherein the light transmitter is further configured to combine first light comprising an image from the display device with second light comprising an image of a real environment in front of an observer and to transmit the combined light to the observer's eye.

14. The image display apparatus of claim 13, wherein the light transmitter further comprises:

a beam splitter disposed obliquely with respect to a traveling path of the first light and a traveling path of the second light.

15. The image display apparatus of claim 14, wherein the beam splitter comprises a half mirror.

16. The image display apparatus of claim 1, wherein the display device comprises a first display device and a second display device, wherein the driver comprises a first driver and a second driver respectively configured to drive the first display device and the second display device such that positions of the first display device and the second display device vary, and wherein the light transmitter comprises a first light transmitter and a second light transmitter configured to transmit images formed by the first display device and the second display device to a left eye and a right eye of the observer, respectively.

17. The image display apparatus of claim 16, wherein the image information comprises information about a pair of a left eye image and a right eye image to be perceived as a three-dimensional (3D) image, and wherein the processor is further configured to control the first display device and the second display device such that the left eye image is formed by the first display device and the right eye image is formed by the second display device.

18. The image display apparatus of claim 17, wherein the image information further comprises:

depth information related to positions of a virtual image plane on which the left eye image and the right eye image are to be imaged, and wherein the processor is further configured to control the first driver and the second driver according to the depth information.

19. The image display apparatus of claim 16, wherein the image display apparatus is a wearable apparatus.

20. An image display apparatus comprising:

a display device configured to modulate light to form an image;

a driver configured to drive the display device such that a position of the display device varies;

a light transmitter configured to transmit the image formed by the display device to an observer's eye and comprising a focusing member;

a processor configured to generate a light modulation signal and a driving signal according to image information and to control the display device and the driver according to the light modulation signal and the driving signal, respectively; and an eye tracking sensor configured to sense a depth position that the observer's eye views, wherein the processor is further configured to:

generate the driving signal based on a depth value set by using a saliency map with respect to each image of a plurality of frames, and based on the depth value set by using the saliency map and a measurement value sensed by the eye tracking sensor belonging to different ranges among a previously set near range and a previously set far range, correct the driving signal.

21. The image display apparatus of claim 20, wherein the processor is further configured to generate the driving signal based on the measurement value sensed by the eye tracking sensor.

22. The image display apparatus of claim 20, wherein the processor is configured to determine whether the measurement value is within a near range or a far range, and generate the driving signal so that the display device is driven to a position corresponding to one of two representative values representing the near range and the far range.

23. The image display apparatus of claim 20, wherein the processor is configured to correct the driving signal based on the measurement value sensed by the eye tracking sensor.

\* \* \* \* \*